US012775635B2

(12) United States Patent
Zhang

(10) Patent No.: US 12,775,635 B2
(45) Date of Patent: Oct. 27, 2026

(54) DATA SYNCHRONIZATION METHOD AND APPARATUS FOR REDUNDANT FIRMWARE, AND NON-VOLATILE READABLE STORAGE MEDIUM

(71) Applicant: Suzhou MetaBrain Intelligent Technology Co., Ltd., Suzhou (CN)

(72) Inventor: Shuaihao Zhang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/987,299

(22) Filed: Dec. 19, 2024

(65) Prior Publication Data

US 2025/0117401 A1 Apr. 10, 2025

Related U.S. Application Data

(63) Continuation of application No. PCT/CN2023/109400, filed on Jul. 26, 2023.

(30) Foreign Application Priority Data

Dec. 13, 2022 (CN) ........................ 202211592780.4

(51) Int. Cl.
*G06F 16/27* (2019.01)
*G06F 9/52* (2006.01)

(52) U.S. Cl.
CPC .............. *G06F 16/278* (2019.01); *G06F 9/52* (2013.01)

(58) Field of Classification Search
CPC ................................ G06F 16/278; G06F 9/52
(Continued)

(56) References Cited

U.S. PATENT DOCUMENTS 6,675,258 B1 * 1/2004 Bramhall ............ G06F 11/1433 714/E11.135
7,415,488 B1 8/2008 Muth et al.
(Continued)

FOREIGN PATENT DOCUMENTS

CN 106528097 A * 3/2017 ......... G06F 9/44536
CN 108345477 A * 7/2018 ......... G06F 9/44505
(Continued)

OTHER PUBLICATIONS

International Search Report cited in PCT/CN2023/109400, mailed Sep. 23, 2023, 8 pages.

(Continued)

*Primary Examiner* — Phuong Thao Cao
(74) *Attorney, Agent, or Firm* — COOPER LEGAL GROUP LLC

(57) ABSTRACT

Provided are a data synchronization method and apparatus for redundant firmware (FW), and a non-volatile readable storage medium, applicable to the technical field of computers. In the method, a shared area is established, and a modifiable partition corresponding to the redundant FW is added to the shared area, so that the FW can access any modifiable partition of the shared area, and a fixed mapping relation between the FW and the modifiable partition is removed, Modifiable partition in the shared area are redundant modifiable partition; if an abnormality occurs in the current FW, the current FW is switched to a FW to be synchronized, and data consistency is achieved by accessing the modifiable partition of the shared area.

15 Claims, 2 Drawing Sheets

(58) Field of Classification Search
USPC .......................................................... 707/634
See application file for complete search history.

(56) References Cited

U.S. PATENT DOCUMENTS

| | | | | |
|---|---|---|---|---|
| 9,734,339 | B2 * | 8/2017 | Jeansonne | G06F 21/575 |
| 9,880,908 | B2 * | 1/2018 | Jeansonne | G06F 3/0619 |
| 10,387,257 | B1 * | 8/2019 | Brown | H04L 67/34 |
| 2003/0145130 | A1 * | 7/2003 | Schultz | G06F 8/65 712/E9.007 |
| 2006/0041882 | A1 * | 2/2006 | Shah | G06F 15/177 717/176 |
| 2006/0224918 | A1 | 10/2006 | Koike | |
| 2011/0093675 | A1 | 4/2011 | Lu et al. | |
| 2012/0151280 | A1 * | 6/2012 | Niesser | G06F 11/1484 714/E11.002 |
| 2016/0055068 | A1 * | 2/2016 | Jeansonne | G06F 21/572 714/15 |
| 2017/0102889 | A1 * | 4/2017 | Lobo | G06F 11/1415 |
| 2021/0011652 | A1 | 1/2021 | Shu et al. | |
| 2022/0121437 | A1 * | 4/2022 | Tokumoto | G06F 8/65 |

FOREIGN PATENT DOCUMENTS

| | | | | | |
|---|---|---|---|---|---|
| CN | 109062517 | A | * | 12/2018 | G06F 8/61 |
| CN | 111045708 | A | | 4/2020 | |
| CN | 112130911 | A | | 12/2020 | |
| CN | 113568587 | A | | 10/2021 | |
| CN | 113626065 | A | * | 11/2021 | G06F 8/70 |
| CN | 113760607 | A | * | 12/2021 | G06F 11/1448 |
| CN | 114385249 | A | * | 4/2022 | G06F 9/4411 |
| CN | 114579151 | A | * | 6/2022 | G06F 8/65 |
| CN | 115167903 | A | * | 10/2022 | G06F 8/654 |
| CN | 115421762 | A | * | 12/2022 | G06F 8/71 |
| CN | 115576705 | A | | 1/2023 | |
| CN | 116627727 | A | * | 8/2023 | G06F 11/2023 |
| JP | 2009237758 | A | * | 10/2009 | |
| JP | 2012059080 | A | * | 3/2012 | |
| JP | 2017021509 | A | * | 1/2017 | |
| WO | 2022134918 | A1 | | 6/2022 | |

OTHER PUBLICATIONS

Written Opinion cited in PCT/CN2023/109400, mailed Sep. 23, 2023, 9 pages.

First Office Action cited in CN202211592780.4, mailed Jan. 19, 2023, 10 pages.

Notification to Grant Patent Right for Invention cited in CN202211592780.4, mailed Feb. 16, 2023, 3 pages.

* cited by examiner

DATA SYNCHRONIZATION METHOD AND APPARATUS FOR REDUNDANT FIRMWARE, AND NON-VOLATILE READABLE STORAGE MEDIUM

CROSS-REFERENCE TO RELATED APPLICATION

This application is a continuation of International Patent Application No. PCT/CN2023/109400, filed on Jul. 26, 2023, which claims priority to Chinese Patent Application No. 202211592780.4, filed with the China National Intellectual Property Administration on Dec. 13, 2022 and entitled "Data Synchronization Method and Apparatus for Redundant Firmware, and Medium". International Patent Application No. PCT/CN2023/109400 and Chinese Patent Application No. 202211592780.4 are incorporated herein by reference in their entireties.

FIELD

Embodiments of the present application relate to the technical field of computers, in particular to a data synchronization method and apparatus for redundant firmware, and a non-volatile readable storage medium.

BACKGROUND

Firmware is widely used in device chips in the fields of storage, servers, cloud data centers and Information Technology (IT), such as Baseboard Management Controller (BMC), Basic Input Output System (BIOS) and various special chip firmware. With increasing requirements for the reliability of the firmware, the design of dual/multi-FW backups and single-firmware failure supporting failover redundancy gradually becomes standard configurations.

There are two ways for realizing the firmware redundancy: one is firmware dual-Flash, and the other one is single-Flash with dualpartition. In either way, the backup and redundancy of read-only partition such as firmware (FW) binary files (image (disk image) partition) are realized at present. For the backup and redundancy of modifiable partition, such as configuration partition, that can be modified during operation, only firmware redundancy is achieved, and the firmware and the modifiable partition are in one-to-one correspondence. In a case where the firmware needs to be switched to another FW partition, the data in the modifiable partition corresponding to the original firmware is not synchronized to the modifiable partition of the current firmware, and the data recording of the modifiable partition needs to be restarted when switching to another firmware, resulting in the data loss of the original FW partition, the data inconsistency of the modifiable partition in the two redundant FW partition, and degrading of user experience.

Therefore, how to achieve the data consistency of the redundant firmware is an urgent problem to be solved by the technical skilled in the art.

SUMMARY

A purpose of the embodiments of the present application is to provide a data synchronization method and apparatus for redundant firmware, and a non-volatile readable storage medium to achieve same data in each modifiable partition, retain related data, and access the modifiable partition of the shared area to achieve the data consistency after switching to another firmware partition.

To solve the above technical problems, an embodiment of the present application provides a data synchronization method for redundant firmware, which includes:

- establishing a shared area of at least one redundant firmware;
- adding at least one modifiable partition corresponding to the redundant firmware to the shared area to remove a mapping relation between the modifiable partition and the redundant firmware, wherein the modifiable partition added to the shared area is a redundant modifiable partition; and
- in response to a current firmware being abnormal, switching to the firmware to be synchronized, and accessing the modifiable partition of the shared area to achieve data consistency.

Optionally, the modifiable partition is a partition configured to modify parameters in an operation process in a Flash partition in the redundant firmware, and the modifiable partition at least includes a Conf partition and a Log partition.

Optionally, a process of determining an abnormal situation of the current firmware includes:

- acquiring a working state of the current firmware corresponding to current preset time and a working state corresponding to next preset time;
- in response to the working state changing, determining the current state of the current firmware; and
- in response to the working state of the current firmware corresponding to current preset time and the working state corresponding to next preset time being different, determining the current firmware being abnormal.

Optionally, data synchronization of the redundant modifiable partition includes:

- receiving current data to be configured; and
- writing the data to be configured into the redundant modifiable partition of the shared area.

Optionally, writing the current data to be configured into the redundant modifiable partition of the shared area includes:

- writing the current data to be configured into the redundant modifiable partition in an asynchronous synchronization mode or a blocking synchronization mode.

Optionally, writing the current data to be configured into the redundant modifiable partition in an asynchronous synchronization mode includes:

- writing the current data to be configured into one modifiable partition of the redundant modifiable partition;
- judging whether a data state of the one modifiable partition changes or not;
- in response to the data state changing, starting a timer to regularly trigger the overwriting of data to be configured in the modifiable partition into other modifiable partition in the redundant modifiable partition.

Optionally, writing the current data to be configured into the redundant modifiable partition in a blocking synchronization mode includes:

- writing the current data to be configured into the redundant modifiable partition respectively within preset time.

Optionally, a number of the redundant modifiable partition is the same as a number of the redundant firmware.

Optionally, prior to switching to the firmware to be synchronized, the method also includes:

- acquiring configuration information of the redundant modifiable partition in the shared area;
- judging whether the configuration information is the same; and in response to the configuration information being the same, proceeding to the switching to the firmware to be synchronized.

Optionally, the method also includes:

acquiring read-only partition corresponding to the redundant firmware respectively; and in response to the current firmware being abnormal, switching to the firmware to be synchronized to access a corresponding read-only partition of the read-only partitions.

Optionally, each of the read-only partition is a partition configured to read and run parameters in the Flash partition in the redundant firmware during the operation, and the read-only partition at least includes a CheckSum partition and an Image partition.

Optionally, when a number of the modifiable partition added to the shared area is one, after adding the modifiable partition corresponding to the redundant firmware to the shared area, the method also includes:

in response to the current firmware being abnormal, switching to the firmware to be synchronized to access the corresponding read-only partition.

Optionally, in response to a number of the redundant firmware being more than two, switching to the firmware to be synchronized includes:

performing priority ranking for the redundant firmware in advance; and in response to the current firmware being abnormal, switching to other firmware serving as the firmware to be synchronized in the redundant firmware except the current firmware according to a priority order.

Optionally, accessing the modifiable partition of the shared area includes:

accessing the modifiable partition corresponding to the firmware to be synchronized in the shared area by default;

setting a partition priority order for the redundant modifiable partition; and in response to the modifiable partition corresponding to the firmware to be synchronized being not configured successfully, accessing the other modifiable partition in the redundant modifiable partition according to the partition priority order.

Optionally, the method also includes:

acquiring upgrading demand information of a client, wherein the upgrading demand information is at least a configuration retaining option or a configuration deleting option; and in response to the upgrading demand information being the configuration deleting option, erasing the data of the modifiable partition, and restoring to a factory setting Optionally, the method also includes:

displaying the upgrading demand information through a display interface for a user to view.

Optionally, the method also includes:

in response to the configuration information being not the same, comparing the configuration information with the data to be configured;

selecting the modifiable partition corresponding to the configuration information same as the current data to be configured from the configuration information as a final modifiable partition; and taking the firmware corresponding to the final modifiable partition as the firmware to be synchronized, and proceeding to the switching to the firmware to be synchronized.

Optionally, the accessing the modifiable partition of the shared area comprises:

accessing the modifiable partition corresponding to the firmware to be synchronized in the shared area by default;

setting a partition priority order for the redundant modifiable partition; and in response to the modifiable partition corresponding to the firmware to be synchronized being not configured successfully, accessing other modifiable partition in the redundant modifiable partition according to the partition priority order.

To solve the above technical problems, an embodiment of the present application also provides a data synchronization apparatus for redundant firmware, which includes:

a memory, configured to store computer programs; and a processor, when executing the computer programs, configured to:

establish a shared area of at least one t redundant firmware; add at least one modifiable partition corresponding to the redundant firmware to the shared area to remove a mapping relation between the modifiable partition and the redundant firmware, wherein the modifiable partition added to the shared area is a redundant modifiable partition; and in response to the current firmware being abnormal, switch to firmware to be synchronized, and access the modifiable partition of the shared area to achieve data consistency.

In order to solve the above technical problems, an embodiment of the present application also provides a non-volatile readable storage medium, wherein the non-volatile readable storage medium stores computer programs, and the computer programs, when executed by a processor, are configured to cause a processor to:

establish a shared area of at least one redundant firmware; add at least one modifiable partition corresponding to the redundant firmware to the shared area to remove a mapping relation between the modifiable partition and the redundant firmware, wherein the modifiable partition added to the shared area is a redundant modifiable partition; and in response to the current firmware being abnormal, switch to firmware to be synchronized, and access the modifiable partition of the shared area to achieve data consistency.

The data synchronization method for the redundant firmware provided by the embodiment of the present application includes: establishing the shared area of the redundant firmware; adding the modifiable partition corresponding to the redundant firmware to the shared area to remove the mapping relation between the modifiable partition and the redundant firmware, wherein the modifiable partition is a redundant modifiable partition; and when the current firmware is abnormal, switching to the firmware to be synchronized, and accessing the modifiable area of the shared area to achieve the data consistency. In the method, by establishing the shared area, the firmware can access any modifiable partition of the shared area, and the fixed mapping relation between the firmware and the modifiable partition is removed, thereby solving the problem in the prior art that when the original firmware is switched to another firmware partition, the data in the modifiable partition corresponding to the original firmware is not synchronized to the modifiable partition of the current firmware, which may result in data loss. The modifiable partition of the shared area is a redundant modifiable partition, data in each modifiable partition is the same, and related data is retained. After switching to another FW partition, the modifiable partition of the shared area is accessed to achieve the data consistency.

Furthermore, the data synchronization apparatus for redundant firmware and the non-volatile readable storage medium provided by the embodiment of the present application have the same beneficial effects as that of the data synchronization method for the redundant firmware.

BRIEF DESCRIPTION OF THE DRAWINGS

To describe the embodiments of the present application more clearly, the accompanying drawings required in the embodiments are introduced briefly below. Apparently, the accompanying drawings in the following description show only some embodiments of the present application, and a person of ordinary skill in the art may still obtain other accompanying drawings from these accompanying drawings without creative efforts.

DETAILED DESCRIPTION

Technical solutions in embodiments of the present application are clearly and completely described in combination with accompanying drawings in embodiments of the present application. Apparently, the described embodiments are merely some embodiments of the present application, not all embodiments. All other embodiments obtained by a person of ordinary skill in the art based on the embodiments of the present application without creative efforts shall fall within the protection scope of the present application.

The present application aims to provide a data synchronization method and apparatus for redundant firmware, and a non-volatile readable storage medium to achieve same data in each modifiable partition, retain related data, and access the modifiable partition of the shared area to achieve the data consistency after switching to another firmware partition.

In order to make those skilled in the art better understand the solutions of the embodiments of the present application, the present application is further described in detail below in combination with the accompanying drawings and optional implementations.

It should be noted that Flash partition in the single firmware include two types, namely, constant partition in the operation and variable partition in the operation. For example, the Conf partition is used as a configuration partition which may be modified by clients and servers during the operation of the product, and belongs to the variable partition, i.e. the modifiable partition mentioned in the embodiments of the present application. Image is a published executable program, which can only be read, written and run, and not modified during the operation of the product, and belongs to the constant partition, i.e. a read-only partition mentioned in the embodiments of the present application. For the constant partition, after the FW is upgraded and written, the partition of the redundant firmware may be kept consistent.

Figure 1:
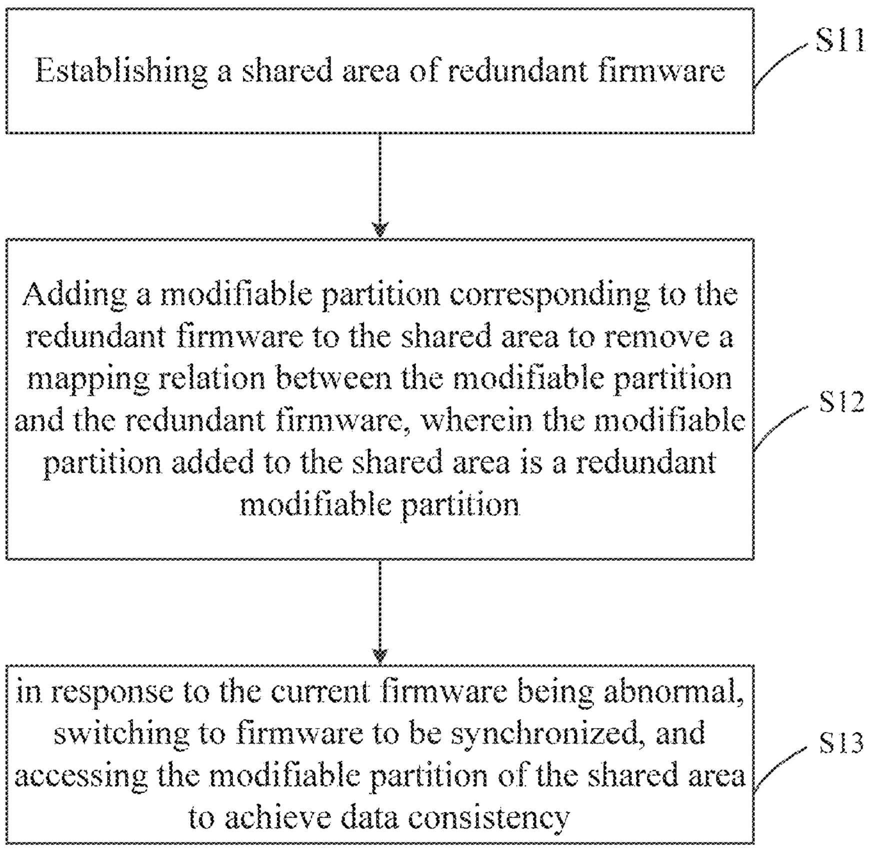
FIG. 1 is a flowchart of a data synchronization method for redundant firmware according to an embodiment of the present application.

FIG. 1 is a flowchart of a data synchronization method for redundant firmware according to an embodiment of the present application. As shown in FIG. 1, the method includes:

- S11: Establishing a shared area of the redundant firmware;
- S12: Adding a modifiable partition corresponding to the redundant firmware to the shared area to remove a mapping relation between the modifiable partition and the redundant firmware, wherein the modifiable partition added to the shared area is a redundant modifiable partition; and
- S13: in response to the current firmware being abnormal, switching to the firmware to be synchronized, and accessing the modifiable partition of the shared area to achieve data consistency.

Optionally, the shared area of the redundant firmware is established. It should be noted that the shared area can be accessed by any running FW. The partition/Flash switching caused by upgrading or the failover Flash triggered by single-Flash switching may not lead to outdated data or inconsistent data. It should be noted that the data synchronization method for the redundant firmware provided by the embodiments of the present application is applicable to dual-Flash partition or single-Flash with dualpartition of one firmware, which is not limited here, and is applicable in both cases. Where, the firmware runs on Flash. The Flash is divided into a plurality of partition which are classified into “modifiable partition” and “unmodifiable partition” according to the attribute whether the partition can be modified when the firmware is running. The “modifiable partition” are generally configured to store logs and customer configuration information. The “unmodifiable partition” are configured to store firmware images.

The shared area refers to a redefinition of the modifiable partition in the Flash. Establishing the shared area of the redundant firmware refers to establishing a partition in the “modifiable partition” of the Flash. Adding the modifiable partition corresponding to the redundant firmware to the shared area refers to adding the information in the modifiable area corresponding to the redundant firmware to the newly-established shared area.

The modifiable partition corresponding to a redundant device is added to the shared area. It may be understood that the modifiable partition of the redundant device is added to the shared area, because the read-only area already keeps the data consistency in the existing redundant firmware, the read-only area of the device firmware is already set at the factory, and no data parameter needs to be changed, whereby it is only necessary to add the modifiable area to the shared area. For example, firmware 1 and firmware 2 correspond to a modifiable partition A and a modifiable partition B respectively. The modifiable partition A and B are added to the shared area, whereby any firmware may access the modifiable partition A and the modifiable partition B. The existing firmware 1 can only establish a mapping relation with the modifiable partition A, and in the embodiments of the present application, the corresponding mapping relation between the firmware and the modifiable partition is removed. When the firmware 1 fails or needs to be upgraded, it is switched to the firmware 2, and the partition corresponding to the firmware 2 may be any modifiable partition of the shared area. To avoid reducing the redundancy of the Flash, the shared area accessible by the dual FW is also set as dualpartition redundancy, that is, the modifiable partition added to the shared area is a redundant modifiable partition.

Similarly, the number of the modifiable partition corresponding to one firmware may be one or more, which can be set according to the actual situation, and is not limited here. When the current firmware is abnormal, it is switched to firmware to be synchronized, and the modifiable partition of the shared area is accessed to achieve data consistency. The firmware to be synchronized may be any redundant firmware except the current firmware. To access the modifiable partition of the shared area, the modifiable partition originally corresponding to the firmware to be synchronized may be accessed, and any other modifiable partition may also be accessed, which is not limited here.

The data synchronization method for the redundant firmware provided by the embodiments of the present application includes: the shared area of the redundant firmware is established; the modifiable partition corresponding to the redundant firmware is added to the shared area to remove the mapping relation between the modifiable partition and the redundant firmware, wherein the modifiable partition is a redundant modifiable partition; and when the current firmware is abnormal, it is switched to the firmware to be synchronized, and the modifiable area of the shared area is accessed to achieve the data consistency. In the method, by establishing the shared area, the firmware can access any modifiable partition of the shared area, and the fixed mapping relation between the FW and the modifiable partition is removed, thereby solving the problem in the prior art that when the original firmware is switched to another FW partition, data in the modifiable partition corresponding to the original firmware is not synchronized to the modifiable partition of the current FW, which may result in data loss. The modifiable partition of the shared area is a redundant modifiable partition, data in each modifiable partition is the same, and related data is retained. After switching to another FW partition, data consistency is achieved by accessing the modifiable partition of the shared area.

On the basis of the above embodiments, the modifiable partition is a partition configured to modify parameters during the operation in a Flash partition in the redundant firmware, and the modifiable partition at least includes a Conf partition and a Log partition.

It should be noted that the modifiable partition is a partition with configuration parameters that can be modified by both the client and server during the product operation, and at least includes a Conf partition and a Log partition. Conf is an abbreviation of a configuration file config, which is mostly configured to store and access installation configuration information of a hardware drive program. Config is a Web (world wide web) configuration command. When a web container is initialized, a ServletConfig (i.e. config) object is configured to transmit information to Java server pages (JSP). The configuration information includes initialization parameters (defined in an application deployment description file web.xml of the current Web application), and shows a ServletContext object of the web application to which the Servlet or JSP belongs. The config object corresponds to the category of javax.servlet. ServletConfig, which is located in a servlet-api.jar package.

The configuration file includes the following three types:

1. Local user profile: The local user profile is created when a user logs on to a computer for the first time, and stored on a local hard disk drive of the computer. Any changes made to the local user profile only affect the changed computer.

2. Roaming user profile: A copy of a local profile is copied and stored on a server share on the network. When the user logs onto any computer of the network every time, the file may be downloaded, and when the user logs off, any changes made to the roaming user profile may be synchronized with the copy of the server. The roaming user profile requires the computer to be a member of a Windows NT domain or an active directory.

3. Mandatory user profile: The mandatory user profile is a special type of configuration file, and an administrator may use the mandatory user profile to specify special settings for the user. Only the system administrator can change the mandatory user profile. When the user logs out of the system, changes made by the user to a desktop may be lost.

The log partition is a system logging partition. If an independent partition is set, even if the log file of the system has problems, main partition of an operating system may not be affected.

Furthermore, offsets corresponding to the Conf partition and the Log partition in the modifiable partition are not limited, which may be set according to the actual situation.

On the basis of the above embodiments, it is mentioned in step S12 that the modifiable partition added to the shared area is a redundant modifiable partition. Therefore, as an embodiment, the data synchronization of the redundant modifiable partition includes:

current data to be configured is received; and the data to be configured is written into the redundant modifiable partition of the shared area.

Optionally, the redundant modifiable partition in the firmware support data synchronization. Strategies are made in the firmware to synchronize the changed data between the redundant and mutually-backup modifiable partition so as to ensure the data consistency. The current data to be configured is received, and the data to be configured is written into the redundant modifiable partition of the shared area. It should be noted that the data to be configured is already stored and written into the redundant modifiable partition before switching to the firmware to be synchronized. A corresponding writing method is not limited, as long as the data to be configured is written into the redundant modifiable partition of the shared area.

As an embodiment, the corresponding writing method may be an asynchronous synchronization mode or a blocking synchronization mode, and the data to be configured is written into the redundant modifiable partition of the shared area, which includes:

the data to be configured is written into the redundant modifiable partition in an asynchronous synchronization mode or a blocking synchronization mode.

Optionally, a concept of asynchronism is that when an operation is performed, a request process may not be blocked after an Input Output (I/O) operation is triggered, that is, the whole process of transmitting the data from a kernel to a user buffer is completed by the kernel, and the user process does not need to be blocked until the I/O operation is completed; and the user process only needs to perform an operation to trigger the I/O operation and can then continue to perform other operations until the user process receives a notification when the I/O operation is completed. Fundamentally, the asynchronism refers to that the process from waiting the data to copying the data to the user space from the kernel space is not blocked, and the asynchronism only involves initializing the operation and notification of the end of the operation. Therefore, the asynchronism can actually achieve no blocking on the I/O operation. The asynchronous synchronization mode of the embodiments of the present application adopts an asynchronous mode, and when one process writes data, another process writes the data after detecting the data.

The blocking synchronization mode means that after an operation is performed on the basis of synchronization, the process triggers the I/O operation (either waiting for data to arrive, i.e. a blocking mode; either polling to check whether the data arrives, that is, in the non-blocking busy polling mode), and then after the data arrives, the user process is blocked until the I/O operation is completed, that is, the second step is blocking. When writing data in a blocking socket scenario, the user process may write all data into a writable buffer of the kernel before returning. This is why, in multiplexing, the socket is set to a non-blocking mode. In blocking mode, when the writing is blocked, the writable buffer of the kernel may hold N bytes, and the data to be sent is N+1 bytes, then write operation may not return, and may be blocked until the extra byte is loaded to the buffer of the kernel. Therefore, in select, when a writable condition is returned, it is necessary to limit the setting of the socket to be non-blocking, whereby it may be said that the one-time write operation returns a positive value. The blocking synchronization mode in the present embodiment ensures that during configuration changes, the changes are written into the modifiable partition at the same time.

As an embodiment, the data to be configured is written into the redundant modifiable partition in an asynchronous synchronization mode, which includes:

the data to be configured is written into a modifiable partition in the redundant modifiable partition;

whether a data state of the modifiable partition changes or not is judged;

if the data state changes, a timer is started to regularly trigger overwriting of data to be configured in the modifiable partition into other modifiable partition in the redundant modifiable partition.

Optionally, the present embodiment corresponds to the corresponding asynchronous synchronization mode, the data to be configured is written into one modifiable partition of the redundant modifiable partition by default, whether the data state of the modifiable partition changes is judged, and if the data state changes in configuration after the data to be configured is written into the current modifiable partition, it is stated that the data state of the current modifiable partition changes. A timer is started to regularly trigger overwriting of data to be configured in the modifiable partition into other modifiable partition in the redundant modifiable partition.

It should be noted that due to different types of redundant modifiable partition, the modifiable partition of the current type is taken as a writing process of the present embodiment to perform the writing of one modifiable partition firstly, FW software detects the data change of the modifiable partition in the background, and if the data changes, overwriting of the data of the modifiable partition into other modifiable partition is triggered regularly. Since the number of the partition of the redundant modifiable partition is not limited, the overwriting process may be simultaneous writing, or serial writing into each modifiable partition of other modifiable partition in the asynchronous synchronization mode.

As an implementation, the data to be configured is written into the redundant modifiable partition in a blocking synchronization mode, which includes:

the data to be configured is written into the redundant modifiable partition respectively within preset time.

Optionally, the present embodiment corresponds to the blocking synchronization mode. Within the preset time, the data to be configured is written into the redundant modifiable partition respectively, for example, there are two redundant modifiable partition, and when the configuration changes, the configuration change can be completed by writing the data to be configured simultaneously into the two modifiable partition. It should be noted that the concept of synchronism refers to that the configuration data is written into the modifiable partition within the preset time, and as long as the writing is completed within the preset time, the writing is synchronous.

As an embodiment, to avoid reducing the redundancy of the Flash, the number of the redundant modifiable partition is the same as that of the redundant firmware.

It may be understood that the number of the redundant modifiable partition corresponding to each type of redundant modifiable partition is the same as that of the redundant firmware. For example, there are two types of modifiable partition in the Flash partition, i.e. Conf partition and Log partition, and there are two redundant firmware, whereby the number of the redundant modifiable partition corresponding to the Conf partition is the same as that of the redundant firmware, i.e. 2. Table 1 is a dual partition redundancy table. See table 1:

TABLE 1

Dualpartition redundancy table

| Flash partition | Description |
|---|---|
| Conf1 | Configuration partition 1 |
| Log1 | Log partition 1 |
| Conf2 | Configuration partition 2 |
| Log2 | Log partition 2 |

The data synchronization process of the redundant modifiable partition provided by the embodiments of the present application ensures that the operation data used by the firmware is the latest data after the firmware is switched subsequently.

On the basis of the above embodiments, a process of determining an abnormal situation of the current firmware includes:

a working state of the current firmware corresponding to current preset time and a working state corresponding to next preset time are acquired;

a current state of the current firmware when the working state changes is determined; and it is determined that the current firmware is abnormal when the current state is firmware upgrading or failover.

It may be understood that the abnormal situation of the current firmware is different from the normal state, whereby the working state of the current firmware corresponding to the current preset time and the working state corresponding to the next preset time are acquired, and when the two working states are different, that is, the working state changes, the current date of the current firmware is determined. It should be noted that the current state of the current firmware is determined. The current state may be changed from a switching or failure state to the normal state, or changed from the normal state to the switching or failure state. Therefore, it is necessary to clarify the current state of the current firmware. If the current state is firmware upgrading or failover, it means that the current firmware is abnormal.

As an optional embodiment, prior to switching to the firmware to be synchronized, the method also includes:

configuration information of the redundant modifiable partition in the shared area is acquired;

whether the configuration information is the same is judged; and if the configuration information is the same, the step of switching to the firmware to be synchronized is proceeded.

It should be noted that the configuration information of the redundant modifiable partition in the shared area is acquired. Since the data in the shared area needs to be kept consistent, it is necessary to judge whether the configuration information is the same, and if the configuration information is the same, the configuration information of the current redundant modifiable partition is determined to be kept consistent, and the step of switching to the firmware to be synchronized is proceeded.

As an embodiment, the method also includes:

when the configuration information is not the same, the configuration information is compared with the data to be configured;

the modifiable partition corresponding to the configuration information same as the data to be configured is selected from the configuration information as a final modifiable partition; and the firmware corresponding to the final modifiable partition is taken as the firmware to be synchronized, and the step of switching to the firmware to be synchronized is proceeded.

Optionally, when the configuration information is not the same, since the modifiable partition are numerous, it is necessary to compare the configuration information with the data to be configured so as to select the modifiable partition corresponding to the configuration information that is the same as the data to be configured as the final modifiable partition, and the corresponding firmware is taken as the firmware to be synchronized, whereby the firmware can be subsequently switched to the firmware to be synchronized.

The process of determining the abnormal situation of the current firmware provided by the embodiment of the present application determines the consistency of the current configuration information to facilitate the subsequent firmware switching.

On the basis of the above embodiments, the method also includes:

read-only partition corresponding to the redundant firmware respectively are acquired; and when the current firmware is abnormal, it is switched to the firmware to be synchronized to access the corresponding read-only partition.

It should be noted that read-only partition corresponding to the redundant firmware respectively are acquired. When the current firmware is abnormal, it is switched to the firmware to be synchronized, and the corresponding read-only partition is accessed. The read-only partition is not located in the shared area, and when the current firmware is switched to the firmware to be synchronized, it is necessary to access the read-only partition corresponding to the firmware to be synchronized.

As an embodiment, the read-only partition is a partition configured to read and run parameters in the Flash partition of the redundant firmware during the operation, and the read-only partition at least includes a CheckSum partition and an Image partition.

Optionally, the read-only partition is a published executable program, which can only be read, run and not modified during the product operation. Offsets of the CheckSum partition and the Image partition are not limited in the embodiments of the present application, and may be set according to the actual situation. CheckSum is a method configured to check whether a data file is changed, and check whether there is data damage or data loss for some important data files during the transmission. The Image file to be burned into the Flash is checked, and the integrity of the written data after burning is checked. The Image partition is an executable file partition.

When the firmware FW is upgraded, when the number of the modifiable partition added to the shared area is one, as an embodiment, after the modifiable partition corresponding to the redundant firmware is added to the shared area, the method also includes:

when the current firmware is abnormal, it is switched to the firmware to be synchronized to access the corresponding read-only partition.

Optionally, when the firmware FW is upgraded, only the read-only partition is upgraded, while the modifiable partition remains unchanged. Therefore, when the modifiable partition is run, data of the modifiable partition is not erased due to the upgrading. Since the number of modifiable partition is one, to ensure that the corresponding data may not be erased by the upgrading the modifiable partition of the firmware, only the read-only partition is upgraded.

The access to the read-only partition provided by the embodiments of the present application is different from the access to the read-only partition when the current firmware is switched to the firmware to be synchronized in addition to the shared area, which improves the user experience.

On the basis of the above embodiments, when the quantity of the redundant firmware is more than two, the current firmware is switched to the firmware to be synchronized, which includes:

priority ranking is performed for the redundant firmware in advance; and when the current firmware is abnormal, it is switched to other firmware serving as the firmware to be synchronized except the current firmware in the redundant firmware according to a priority order.

It may be understood that when the quantity of the redundant firmware is more than two, the firmware is switched to the firmware to be synchronized, and multiple firmware to be synchronized may exist, whereby it is necessary to perform priority ranking for the redundant firmware in advance when selecting which firmware to be synchronized. When the current firmware is abnormal, other firmware in the redundant firmware except the current firmware is taken as the firmware to be synchronized according to a priority order. For example, there are 4 redundant firmware A, B, C and D. The current firmware is A, and the firmware to be synchronized is the firmware B, C and D. If the priority order determined is C, D and B, the firmware C is selected as the firmware to be synchronized first, and if the firmware C is abnormal, the firmware D is selected subsequently.

Correspondingly, the priority order may be set according to the corresponding upgrading or failure state of each firmware, and may also be set according to other orders, which is not limited here, and may be set according to the actual situation.

On the basis of the above embodiments, the modifiable partition of the shared area is accessed, which includes:

the modifiable partition corresponding to the firmware to be synchronized in the shared area is accessed by default;

a partition priority order is set for the redundant modifiable partition; and when the modifiable partition corresponding to the firmware to be synchronized is not configured successfully, other modifiable partition in the redundant modifiable partition is accessed according to the priority order.

Optionally, the priority order is set for the firmware to be synchronized in the above embodiment. Meanwhile, the redundant modifiable partition also have the priority order. Firstly, the modifiable partition corresponding to the firmware to be synchronized is accessed by default, and the priority order of the redundant modifiable partition is preset. If the modifiable partition corresponding to the firmware to be synchronized is not configured successfully, other modifiable partition are accessed according to the partition priority order of the partition to complete the access of the current firmware to be synchronized to the modifiable partition of the shared area.

The switching order of the firmware to be synchronized and the access order of the modifiable partition provided by the embodiments of the present application are set respectively according to the corresponding priority, whereby the congestion phenomenon during the upgrading of the firmware is avoided, the data consistency is ensured, and the upgrading efficiency of the firmware is improved.

On the basis of the above embodiments, the method also includes:

upgrading demand information of a client is acquired, wherein the upgrading demand information is at least a configuration retaining option or a configuration deleting option; and when the upgrading demand information is the configuration deleting option, the data of the modifiable partition is erased, and the modifiable partition is restored to a factory setting.

Optionally, considering that in some cases, customers intend to initialize the running data to the factory settings during upgrading, an option of not retaining the configuration upgrading during upgrading is added, and an upgrading process with the option may erase the data of the modifiable partition, and restore to the factory settings.

On the basis of the above embodiments, the method also includes:

the upgrading demand information is displayed through a display interface for a user to view.

Correspondingly, the option of the upgrading demand information is displayed through the display interface, whereby the user knows the current upgrading situation in real time.

The upgrading demand information of the client provided by the present embodiment can be deleted and retained, and displayed through the display interface at the same time to improve the user experience.

Figure 2:
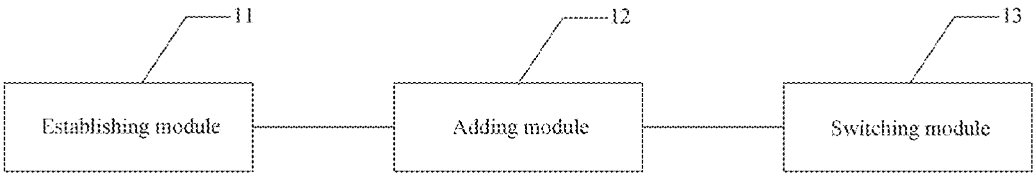
FIG. 2 is a structural diagram of a data synchronization apparatus for redundant firmware according to an embodiment of the present application.

Various embodiments corresponding to the data synchronization method for the redundant firmware are described in detail above. Based on this, an embodiment of the present application also discloses a data synchronization apparatus for redundant firmware corresponding to the method. FIG. 2 is a structural diagram of the data synchronization apparatus for the redundant firmware according to an embodiment of the present application. As shown in FIG. 2, the data synchronization apparatus for the redundant firmware includes:

an establishing module 11, configured to establish a shared area of the redundant firmware;

an adding module 12, configured to add a modifiable partition corresponding to the redundant firmware to the shared area to remove a mapping relation between the modifiable partition and the redundant firmware, wherein the modifiable partition added to the shared area is a redundant modifiable partition; and a switching module 13, configured to switch to firmware to be synchronized when the current firmware is abnormal, and access the modifiable partition of the shared area to achieve data consistency.

The embodiments of the apparatus correspond to the above embodiments, whereby the embodiments of the apparatus are described with reference to the embodiments of the method, and are not repeated here.

The data synchronization apparatus for the redundant firmware provided by the embodiments of the present application is introduced with reference to the method embodiments, which is not repeated here, and the apparatus has the same beneficial effects as that of the data synchronization method for the redundant firmware.

Figure 3:
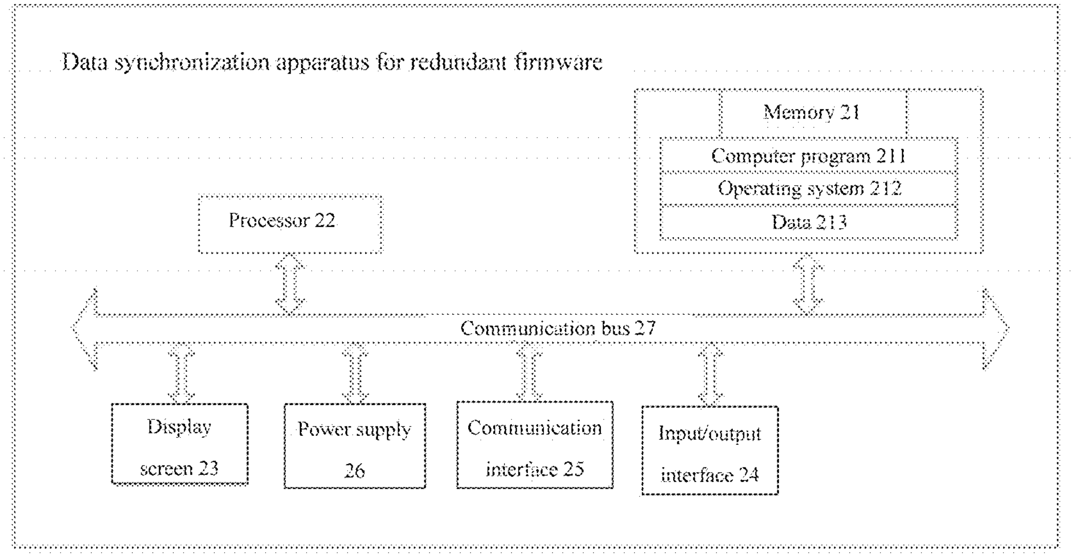
FIG. 3 is a structural diagram of another data synchronization apparatus for redundant firmware according to an embodiment of the present application.

FIG. 3 is a structural diagram of another data synchronization apparatus for redundant firmware according to an embodiment of the present application. As shown in FIG. 3, the apparatus includes:

a memory 21, configured to store computer programs; and a processor 22, configured to implement steps of the data synchronization method for the redundant firmware when executing the computer programs.

The data synchronization apparatus for the redundant firmware provided by the present embodiment may include, but is not limited to a smart phone, a tablet computer, a notebook computer, a desktop computer, and the like.

The processor 22 may include one or more processing cores, such as a 4-core processor, an 8-core processor, and the like. The processor 22 may be implemented in at least one hardware form of a digital signal processor (DSP), a field-programmable gate array (FPGA), and a programmable logic array (PLA). The processor 22 may also include a main processor and a coprocessor. The main processor is a processor configured to process data in an awake state, and is also referred to as a central processing unit (CPU). The coprocessor is a processor with low power consumption configured to process the data in a standby state. In some embodiments, the processor 22 may be integrated with a graphics processing unit (GPU). The GPU is configured to render and draw content that needs to be displayed on a display screen. In some embodiments, the processor 22 may also include an artificial intelligence (AI) processor. The AI processor is configured to process computing operations related to machine learning.

The memory 21 may include one or more non-volatile readable storage media. The non-volatile readable storage medium may be non-transient. The memory 21 may further include a high-speed random access memory and a non-volatile memory, such as one or more disk storage devices or flash storage devices. In the present embodiment, the memory 21 is at least configured to store the following computer program 211, wherein after being loaded and executed by the processor 22, the computer program can implement relevant steps of the data synchronization method for the redundant firmware disclosed by any of the aforementioned embodiments. In addition, resources stored in the memory 21 may also include an operating system 212 and data 213, and may be stored temporarily or permanently. The operating system 212 may include Windows, Unix, Linux, etc. The data 213 may include, but is not limited to the data related to the data synchronization method for the redundant firmware.

In some embodiments, the data synchronization apparatus for the redundant firmware may also include a display screen 23, an input/output interface 24, a communication interface 25, a power supply 26, and a communication bus 27.

A person skilled in the art may understand that the structure shown in FIG. 3 constitutes no limitation to the data synchronization apparatus for the redundant firmware, and may include more or fewer components than those shown in the figure.

The processor 22 implements the data synchronization method for the redundant firmware provided by any of the above embodiments by invoking commands stored in the memory 21.

The data synchronization apparatus for the redundant firmware provided by the embodiments of the present application is introduced with reference to the method embodiments, which is not repeated here, and the apparatus has the same beneficial effects as that of the data synchronization method for the redundant firmware.

Optionally, an embodiment of the present application further provides a non-volatile readable storage medium, wherein the non-volatile readable storage medium stores computer programs, and the computer programs, when executed by a processor 22, implement steps of the above data synchronization method for the redundant firmware.

It may be understood that if the method in the above embodiments is implemented in a form of a software functional unit and sold or used as an independent product, it can be stored in a non-volatile readable storage medium. Based on this understanding, the technical solutions of the embodiments of the present application are substantially or a part making contribution to the prior art or all or some of the technical solutions may be embodied in a form of software products. The computer software product is stored in a non-volatile readable storage medium, and executes all or some of steps of the method described in all embodiments of the present application. The foregoing non-volatile readable storage medium includes various non-volatile readable storage media capable of storing the program codes, such as a USB flash drive, a portable hard disk, a Read-Only Memory (ROM), a Random Access Memory (RAM), a magnetic disk or a compact disk, etc.

The non-volatile readable storage medium provided by the embodiments of the present application is introduced with reference to the method embodiments, which is not repeated here, and the non-volatile readable storage medium has the same beneficial effects as that of the data synchronization method for the redundant firmware.

The data synchronization method for the redundant firmware, the data synchronization apparatus for the redundant firmware, and the non-volatile readable storage medium provided by the embodiments of the present application are described in detail above. Each embodiment of the present specification is described in a progressive manner, each embodiment focuses on the difference from other embodiments, and the same and similar parts between the embodiments may refer to each other. Apparatuses disclosed in embodiments are simple in description because they correspond to the methods disclosed in the embodiments, and relevant information was referred to the description of the method. It should be pointed out that various improvements and modifications may be made by those skilled in the art without departing from the concept of the embodiments of the present application. These improvements and modifications should also fall within the protection scope of the embodiments of the present application.

It also should be noted that relational terms used herein such as first and second, etc. are only used herein to distinguish one entity or operation from another entity or operation, and do not necessarily require or imply any such actual relation or sequence between these entities or operations. Moreover, terms “include”, “contain” or any other variations thereof are intended to cover a non-exclusive inclusion, so that a process, method, article, or apparatus including a series of elements does not include only those elements but also other elements not expressly listed or also includes the intrinsic elements of the process, method, article, or apparatus. Without further limitations, an element defined by the sentence “including an . . . ” do not exclude the presence of other same elements in the process, method, article or apparatus including the element.

What is claimed is:

1. A data synchronization method for redundant firmware, comprising:

establishing a shared area;

adding each of modifiable partitions corresponding to each of redundant firmware to the shared area to remove a mapping relation between each of the modifiable partitions and each of the redundant firmware, wherein all of the modifiable partitions added into the shared area are collectively referred to as a redundant modifiable partition, a number of the modifiable partitions in the redundant modifiable partition is equal to a number of the redundant firmware;

receiving current data to be configured;

writing the current data to be configured into all of the modifiable partitions of the redundant modifiable partition in the shared area;

in response to a current firmware being abnormal, acquiring configuration information of each of the modifiable partitions of the redundant modifiable partition in the shared area, judging whether the configuration information of each of the modifiable partitions is identical, in response to all of the configuration information of the modifiable partitions in the shared area being identical, switching to a firmware to be synchronized, wherein a plurality of the redundant firmware includes the current firmware and the firmware to be synchronized, the firmware to be synchronized being any of the redundant firmware other than the current firmware, and accessing data of a modifiable partition of the firmware to be synchronized in the shared area to achieve data consistency; and in response to all of the configuration information of the modifiable partitions in the shared area being inconsistent, comparing all of the configuration information of the modifiable partitions of the redundant modifiable partition with the current data to be configured, and selecting, from all of the configuration information of the modifiable partitions of the redundant modifiable partition, a modifiable partition corresponding to configuration information identical to the current data to be configured as a final modifiable partition, and taking a firmware corresponding to the final modifiable partition as the firmware to be synchronized, switching to the firmware to be synchronize and accessing the data of the modifiable partition of the firmware to be synchronized in the shared area to achieve the data consistency.

2. The data synchronization method for redundant firmware according to claim 1, wherein each of the modifiable partitions corresponding to each of the redundant firmware is a partition configured to modify parameters during operation in a Flash partition in each of the redundant firmware, and each of the modifiable partitions at least comprises a Conf partition and a Log partition.

3. The data synchronization method for redundant firmware according to claim 2, wherein a process of determining an abnormal situation of the current firmware comprises:

acquiring a working state of the current firmware corresponding to current time and a working state corresponding to next time; and in response to the working state of the current firmware corresponding to the current time and the working state corresponding to the next time being different, and a current state being firmware upgrading or failover, determining that the current firmware is abnormal.

4. The data synchronization method for redundant firmware according to claim 1, wherein the writing the current data to be configured into all of the modifiable partitions of the redundant modifiable partition in the shared area comprises:

writing the current data to be configured into all of the modifiable partitions of the redundant modifiable partition in an asynchronous synchronization mode or a blocking synchronization mode.

5. The data synchronization method for redundant firmware according to claim 4, wherein the writing the current data to be configured into all of the modifiable partitions of the redundant modifiable partition in an asynchronous synchronization mode comprises:

writing the current data to be configured into one modifiable partition of the redundant modifiable partition;

judging whether a data state of the one modifiable partition changes or not; and in response to the data state changing, starting a timer to regularly trigger overwriting of the current data to be configured in the one modifiable partition into another modifiable partition in the redundant modifiable partition.

6. The data synchronization method for redundant firmware according to claim 4, wherein the writing the current data to be configured into all of the modifiable partitions of the redundant modifiable partition in a blocking synchronization mode comprises:

writing the current data to be configured into the redundant modifiable partition respectively within preset time.

7. The data synchronization method for redundant firmware according to claim 1, wherein further comprising:

in response to the current firmware being abnormal, switching to the firmware to be synchronized, and accessing a corresponding read-only partition of the firmware to be synchronized.

8. The data synchronization method for redundant firmware according to claim 7, wherein the corresponding read-only partition of the firmware to be synchronized is a partition configured to read and run parameters during an operation in a Flash partition in the firmware to be synchronized, and the corresponding read-only partition of the firmware to be synchronized at least comprises a CheckSum partition and an Image partition.

9. The data synchronization method for redundant firmware according to claim 7, wherein the switching to the firmware to be synchronized comprises:

performing priority ranking for the plurality of the redundant firmware in advance; and in response to the current firmware being abnormal, switching to other firmware serving as the firmware to be synchronized except the current firmware in the plurality of the redundant firmware according to a priority order.

10. The data synchronization method for redundant firmware according to claim 9, wherein the accessing data of a modifiable partition of the firmware to be synchronized in the shared area comprises:

accessing a modifiable partition corresponding to the firmware to be synchronized in the shared area by default;

setting a partition priority order for the redundant modifiable partition; and in response to the modifiable partition corresponding to the firmware to be synchronized being not configured successfully, accessing other of the modifiable partition in the redundant modifiable partition according to the partition priority order.

11. The data synchronization method for redundant firmware according to claim 1, wherein the accessing data of a modifiable partition of the firmware to be synchronized in the shared area comprises:

accessing a modifiable partition corresponding to the firmware to be synchronized in the shared area by default;

setting a partition priority order for the redundant modifiable partition; and in response to the modifiable partition corresponding to the firmware to be synchronized being not configured successfully, accessing other of the modifiable partition in the redundant modifiable partition according to the partition priority order.

12. The data synchronization method for redundant firmware according to claim 11, further comprising:

acquiring upgrading demand information of a client, wherein the upgrading demand information is at least a configuration retaining option or a configuration deleting option; and in response to the upgrading demand information being the configuration deleting option, erasing data in all of the modifiable partitions of the redundant modifiable partition, and restoring to a factory setting.

13. The data synchronization method for redundant firmware according to claim 12, further comprising:

displaying the upgrading demand information through a display interface for a user to view.

14. A data synchronization apparatus for redundant firmware, comprising:

a memory, configured to store computer programs; and a processor, when executing the computer programs, configured to:

establish a shared area;

add each of modifiable partitions corresponding to each of redundant firmware to the shared area to remove a mapping relation between each of the modifiable partitions and each of the redundant firmware, wherein all of the modifiable partitions added into the shared area are collectively referred to as a redundant modifiable partition, a number of the modifiable partitions in the redundant modifiable partition is equal to a number of the redundant firmware;

receive current data to be configured;

write the current data to be configured into all of the modifiable partitions of the redundant modifiable partition in the shared area;

in response to a current firmware being abnormal, acquire configuration information of each of the modifiable partitions of the redundant modifiable partition in the shared area, judge whether the configuration information of each of the modifiable partitions is identical, in response to all of the configuration information of the modifiable partitions in the shared area being identical, switch to a firmware to be synchronized, wherein a plurality of the redundant firmware includes the current firmware and the firmware to be synchronized, the firmware to be synchronized being any of the redundant firmware other than the current firmware, and access data of a modifiable partition of the firmware to be synchronized in the shared area to achieve data consistency; and in response to all of the configuration information of the modifiable partitions in the shared area being inconsistent, compare all of the configuration information of the modifiable partitions of the redundant modifiable partition with the current data to be configured, and select, from all of the configuration information of the modifiable partitions of the redundant modifiable partition, a modifiable partition corresponding to configuration information identical to the current data to be configured as a final modifiable partition, and take a firmware corresponding to the final modifiable partition as the firmware to be synchronized, switch to the firmware to be synchronize and access the data of the modifiable partition of the firmware to be synchronized in the shared area to achieve the data consistency.

15. A non-volatile readable storage medium, wherein having computer programs stored thereon, the computer programs, when executed by a processor, are configured to cause the processor to:

establish a shared area;

add each of modifiable partitions corresponding to each of redundant firmware to the shared area to remove a mapping relation between each of the modifiable partitions and each of the redundant firmware, wherein all of the modifiable partitions added into the shared area are collectively referred to as a redundant modifiable partition, a number of the modifiable partitions in the redundant modifiable partition is equal to a number of the redundant firmware;

receive current data to be configured;

write the current data to be configured into all of the modifiable partitions of the redundant modifiable partition in the shared area;

in response to a current firmware being abnormal, acquire configuration information of each of the modifiable partitions of the redundant modifiable partition in the shared area, judge whether the configuration information of each of the modifiable partitions is identical, in response to all of the configuration information of the modifiable partitions in the shared area being identical, switch to a firmware to be synchronized, wherein a plurality of the redundant firmware includes the current firmware and the firmware to be synchronized, the firmware to be synchronized being any of the redundant firmware other than the current firmware, and access data of a modifiable partition of the firmware to be synchronized in the shared area to achieve data consistency; and in response to all of the configuration information of the modifiable partitions in the shared area being inconsistent, compare all of the configuration information of the modifiable partitions of the redundant modifiable partition with the current data to be configured, and select, from all of the configuration information of the modifiable partitions of the redundant modifiable partition, a modifiable partition corresponding to configuration information identical to the current data to be configured as a final modifiable partition, and take a firmware corresponding to the final modifiable partition as the firmware to be synchronized, switch to the firmware to be synchronize and access the data of the modifiable partition of the firmware to be synchronized in the shared area to achieve the data consistency.

* * * * *